Figure 1:
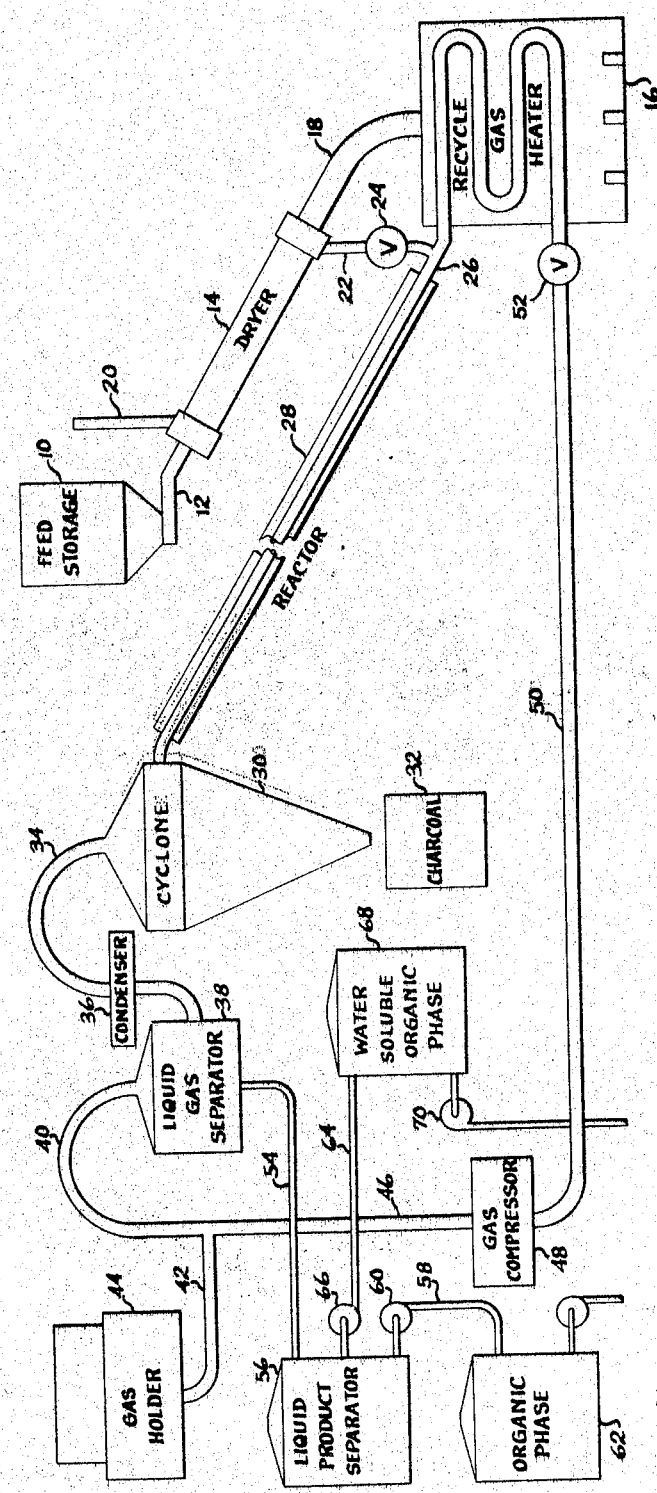

INVENTOR.
ARNULF K. ESTERER

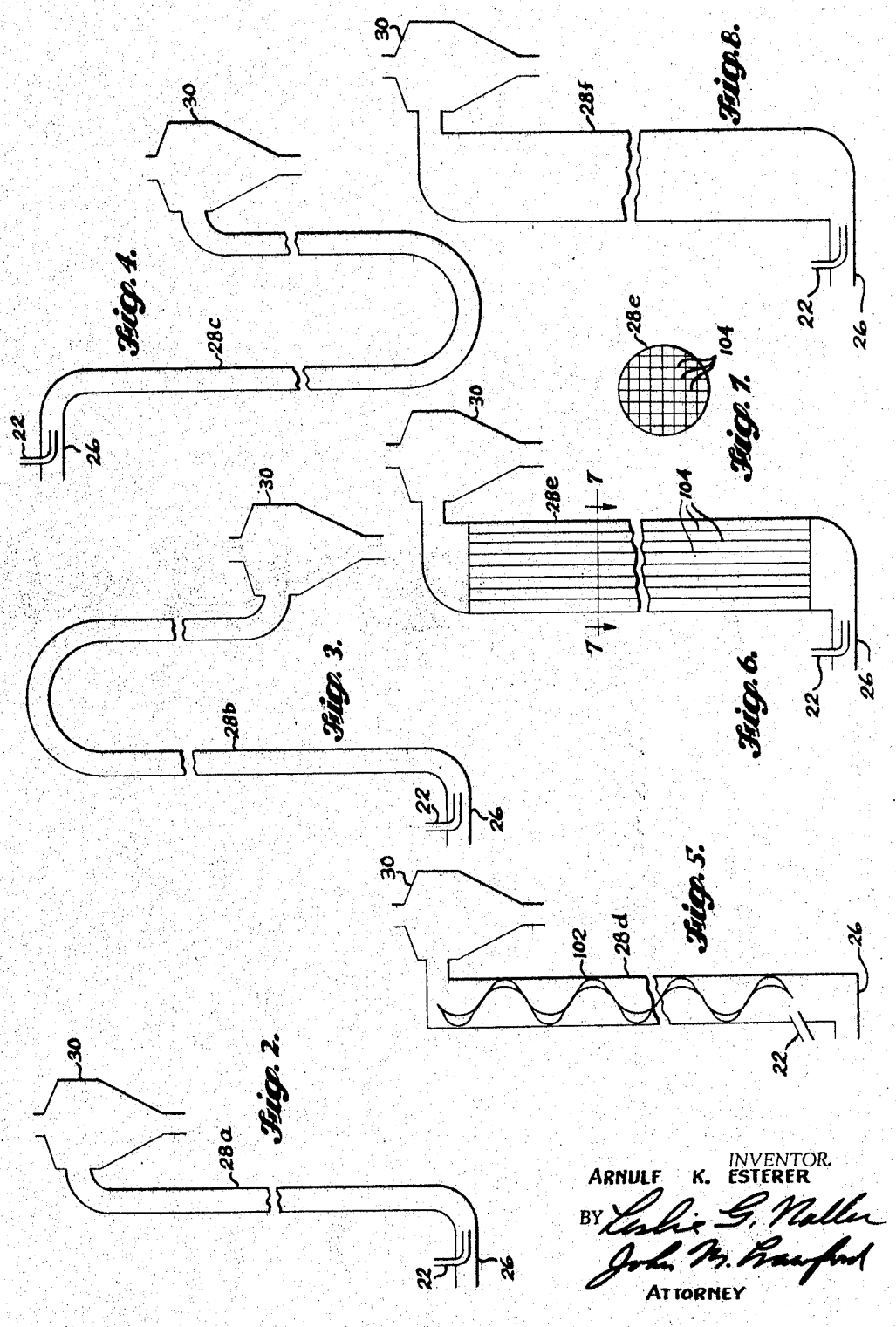

United States Patent Office 3,298,928
Patented Jan. 17, 1967

3,298,928
PYROLYSIS OF CELLULOSIC MATERIAL IN CONCURRENT GASEOUS FLOW
Arnulf K. Esterer, Longview, Wash., assignor to Weyerhaeuser Company, Tacoma, Wash., a corporation of Washington
Original application Nov. 22, 1963, Ser. No. 325,660. Divided and this application Jan. 18, 1966, Ser. No. 521,280
9 Claims. (Cl. 201—6)

This is a division of my copending patent application Serial No. 325,660, filed November 22, 1963 and now abandoned.

This invention relates to the pyrolysis of cellulosic material. In particular it relates to the pyrolysis of lignocellulose, especially wood, by entraining sawdust or other small lignocellulose particles in a gaseous stream and moving the particles concurrently with the stream through a reaction zone in which the lignocellulose is converted to useful degradation products such as levoglucosan and various carbohydrate-derived acids such as humic, saccharic and saccharinic acids.

Both of these classes of degradation products have important or potentially important commercial applications.

Levoglucosan potentially is useful as a raw material for the large scale production of plasticizers, explosives, propellants, surfactants, plastics, resins, and other products.

The carbohydrate-derived acids potentially are useful as raw materials for use in the synthetic organic chemical industry, and also as substitutes for citric acid in the foodstuff industry.

Both levoglucosan and the carbohydrate-derived acids are of particular interest economically since they are derivable from wood and other lignocellulose materials at very low cost. Their production accordingly affords a possible commercial utilization and economic upgrading of waste wood products such as sawdust, chips and shavings.

Although both levoglucosan and the carbohydrate-derived acids theoretically are obtainable in high yields by the cleavage of lignocellulose, in practice the yields resulting from the prior art pyrolytic procedures have been quite small for various reasons.

For example, the lignin content of the lignocellulose interferes with the pyrolysis reaction, leading to the development of interfering side reactions. Under the conditions of the pyrolysis levoglucosan itself pyrolyzes readily into simpler products, such as acetic acid, acetone, phenols, water carbon monoxide gas, and char. Under certain conditions levoglucosan repolymerizes into products of higher molecular weight. Its isolation and purification are difficult. Passage of the desired pyrolytic products through a bed of char, which is one of the products of the reaction, necessitated by some of the prior art procedures, induces the breakdown of the reaction products. It is difficult to maintain the lignocellulose particles in uniform suspension in the entrained gaseous medium so that a uniform reaction and a uniform reaction product are obtained. Control of the process conditions is extremely difficult.

Accordingly, it is the primary purpose of the present invention to provide a practical process, and apparatus, for the pyrolytic conversion of cellulosic material, especially sawdust and other lignocellulose materials into levoglucosan, carbohydrate-derived acids, and other desirable end products, at relatively low cost, using wood waste starting materials such as sawdust, wood chips, shavings and sugar cane bagasse.

The manner in which the foregoing and other objects of the invention are accomplished will be apparent from the accompanying specifications and claims considered together with the drawings, wherein:

FIGURE 1 is a schematic flow plan of apparatus which may be employed in the presently described pyrolysis of lignocellulose in concurrent gaseous flow; and FIGURES 2–8, inclusive, are schematic views of different types of pyrolytic reactors which may be included in the apparatus of FIGURE 1, FIGURE 7 being a cross sectional view of the pyrolytic reactor of FIGURE 6, taken along line 7—7 of that figure.

The process of the present invention takes advantage of the fact that, even though the pyrolytic degradation of lignocellulose to levoglucosan and carbohydrate-derived acids, and the further degradation of these desired products into carbon monoxide and other undesirable end products occurs in a time period of but a few seconds, proper control of the reaction to favor the production of the desired products and minimize the production of undesirable by-products may be achieved by moving the lignocellulose particles and entraining gas through the pyrolysis zone, in concurrent flow, at a high rate of speed.

Such a procedure has the primary advantage of minimizing the passage of the levoglucosan and carbohydrate-derived acids through a fixed bed of char. This, in turn, minimizes degradation of the levoglucosan and carbohydrate-derived acids into carbon monoxide and other undesirable by-products.

Passage of the lignocellulose particles and gaseous entraining medium through the reactor in concurrent flow also overcomes the other primary difficulty attending the pyrolysis of lignocellulose, i.e. that of forming in the first instance a uniform feed, and maintaining such a feed throughout the duration of the reaction.

In concurrent flow, the sawdust or other lignocellulose particles may be mixed with the gas accurately, maintained in suspension and in uniform mixture with the gas throughout the entire reaction period without coalescence. As a result, cracking and degradation of the levoglucosan and carbohydrate-derived acids are kept at a minimum, and high yields of these desired end products are obtained.

In its broadest aspect, the process of the present invention thus comprises introducing small pieces of cellulosic material, particularly wood or other lignocellulose, and a gaseous medium in concurrent flow through a reaction zone where they are heated to a temperature of from 600–1500° F. The particles are maintained at this temperature for a reaction period not exceeding 30 seconds.

There thus is formed a pyrolyzed product comprising char, noncondensable gases and condensable gases, which include the levoglucosan and carbohydrate-derived acids.

At the conclusion of the brief reaction period, the gaseous and char products of the pyrolysis are removed from the pyrolysis zone and cooled to a temperature which is above the condensing temperature of the condensable gases.

Before or after cooling, the gaseous products are separated from the char. They then separately are cooled further, condensing the condensable gases including the levoglucosan. The resulting gas phase then is separated from the resulting liquid phase.

The liquid phase is made up of a non-aqueous phase and an aqueous phase. These are separated. The non-aqueous phase contains useful tars and phenolic bodies. The aqueous phase contains the desired end products, i.e. levoglucosan and the carbohydrate-derived acids. It may be processed by a selected one of several procedures for recovery of these products in high yield.

In the alternative, the cooling of the pyrolyzed product may be accomplished in a single step condensing the condensable gases, including the levoglucosan, and resulting in a liquid product admixed with char. The non-condensable gaseous component then is separated from the resulting liquid and char product. The latter product separates in a non-aqueous phase containing char, tars and phenolic bodies and an aqueous phase containing levoglucosan and carbohydrate-derived acids which may be recovered by a selected one of several processes.

The term, non-aqueous phase, as used herein and in the claims is understood not to exclude the presence of small percentages of aqueous liquids.

A variety of cellulosic materials may be employed as raw materials for the presently described procedure. Such materials include cotton linters, shredded pulp, sugar cane bagasse, cornstalks, corn cobs, tree bark and, particularly, the wood of various species of trees. The latter advantageously may be in the form of such waste wood products as sawdust, wood chips, flakes and shavings, which are available in very large quantitites at low cost and presently comprise waste by-products of the lumber industry.

Before entraining it in the gaseous medium, the cellulosic raw material is reduced in size to the form of small, suspendable pieces. Although the size of the pieces is subject to some variation, a product which will pass a 4-mesh sieve, U.S. Sieve Series, is suitable for the present purpose. Where sawdust is the starting material, it advantageously may be passed through a screen in order to screen out any large splinters or other large pieces which might interfere with the processing of the material.

The moisture content of the starting material also desirably may be controlled to a level of less than 5% by weight, based on the dry weight of the starting material. This is desirable in order to avoid the economic loss which would result from vaporizing a large amount of water. It also is desirable in order to maintain the temperature within the reactor at the necessary level.

The cellulosic material may be dried in any suitable manner, preferably by air drying, or by suspending it in hot gas, to a moisture content of from 2–5%.

Although a variety of gases may be employed for entraining the cellulosic particles, the one selected should be substantially free of oxidizing effects under the pyrolytic conditions, non-explosive, and preferably non-toxic. Suitable gases accordingly comprise nitrogen, carbon dioxide, steam and product gas, i.e. the gaseous product resulting from the pyrolytic degradation of the cellulose material.

Of these, steam may be employed to advantage since it has a high heat capacity and heats the raw material rapidly to the reaction temperature. Also, during the condensation of the condensable gases in the product, the steam is converted to water. This helps to complete the condensation of tar aerosols or smokes which are present in substantial proportion and which are difficult to condense. Still further, by controlling the amount of steam used as a carrier, the degree of dilution of the aqueous phase product may be controlled as required for further processing.

It is preferred to use superheated steam rather than saturated steam. This is desirable to insure proper heating and also prevent excessive water dilution of the product.

The non-condensable gaseous product of the pyrolytic reaction, i.e. "product gas" also may be employed to advantage as a carrier gas. Although the composition of this gas is somewhat variable, it comprises predominantly carbon dioxide, methane and small amounts of unsaturated hydrocarbons. These are produced in sufficient quantity to serve as a suspending and entraining medium to fill the system completely, and to make up any gas losses.

The gaseous medium is preheated to a temperature sufficient to bring the cellulosic material to pyrolyzing temperature when it is mixed with the gas. Accordingly, it is preheated to a temperature which when it is mixed in the predetermined ratio with the solid particles of the raw material will bring the particles to a temperature within the range of, broadly, from 600°–1500° F.

The identity of the cellulosic material, the nature and capacity of the reactor employed, the size of the suspendable pieces and the procedure by which the reaction products are processed, all determine the particular gas-to-particle ratio which is employed. Sufficient gas must be employed to suspend and transport the particles through the processing stages. On the other hand, if too high a proportion of gas is employed, the procedure becomes uneconomical and it may become difficult to fractionate the products of the reaction.

In general, a satisfactory ratio is from 5 to 20 pounds of carrier gas for each pound of oven dry cellulosic material.

The temperature prevailing within the reactor through which the particles and gas are passed in concurrent flow is broadly from 600–1500° F. A preferred reaction temperature, insuring the production of particularly high yields of levoglucosan, is from 700–1100° F.

Within the reaction zone, the flow of gas is regulated so as to produce concurrent flow, i.e. flow together in the same direction, of the gas and suspended cellulosic particles. To accomplish this purpose, the velocity of the gas stream is established within the reaction zone at a level which exceeds the carrying velocity of the particles or, stated otherwise, at a velocity which exceeds the sedimentation velocity of the particles. The gas velocity thus necessarily is quite high, being of the order of from 2000–8000 feet per minute, or even higher.

The arrangement within the reactor is such that the gaseous stream does not traverse a fixed bed of char with consequent degradation of the pyrolytic products. However, the arrangement and dimensions of the bed, as well as the speed of flow of the gas may be varied so as to balance or suspend the particles momentarily in their passage through the reactor as required to continue their pyrolysis to the desired degree. As pointed out hereinafter, this lends flexibilty to the system in that particles of mixed size may be processed, the passage of the larger, heavier particles through the reactor being interrupted pending their conversion to lighter particles by the pyrolytic process.

By adjusting the gas flow rate, the exposure of the pyrolysis gases to high temperature is kept at a minimum, since they are swept from the reactor substantially as soon as they are formed. It thus is possible to secure a time-at-temperature of the particles not exceeding 30 seconds, preferably not exceeding 10 seconds, the selected time being dependent primarily upon the particle size and the temperature of pyrolysis. This is in sharp contrast to the old wood carbonizing techniques which required many hours to complete.

Excessive char formation and minimizing the occurrence of secondary reactions of decomposition or repolymerization of the levoglucosan, are prevented by maintaining the reaction time at a relatively low value. In other words, sweeping the levoglucosan and other pyrolysis products from the reaction zone with the concurrently flowing gas after an exposure time of but a few seconds, favors the conversion of the cellulose to levoglucosan and prevents the further decomposition or change of that product into unwanted by-products.

The product leaving the reaction zone contains broadly from 10–50% by weight char, from 15–60% fixed non-condensable gases and from 20–65% condensable gases.

In the first stage of its processing, the mixture is passed through a solid-gas phase separator which may comprise a cloth filter, a centrifuge or, preferably, a cyclone separator. During the separation the separator is kept hot at a temperature above the condensation temperature of the condensable gases in order to eliminate plugging of the separator elements with tar, and to prevent loss of valuable volatile products. Also, the dwell time in the hot separator is kept at a minimum, i.e. not over a few seconds, in order to prevent or minimize decomposition of the levoglucosan and carbohydrate-derived acids.

The solid product leaving the separator comprises the char. This has a fixed carbon content of the order of 65–90% by weight in the event that the conversion of the cellulosic starting material in the reactor has been substantially complete. The fixed carbon level of the char may be varied by control of the operating variables, however, as determined by the end use to which the product is to be put. When it is to be used as absorption charcoal, it should be substantially free from tar. However, if it is to be applied to the manufacture of fuel briquets, a lower carbon content is permissible, the increased tar content serving as an adhesive to bind the char particles into briquets.

The gaseous product leaving the solid-gas phase separator includes both condensable and non-condensable gases. It accordingly is passed through a condenser unit which may comprise a battery of individual, water-cooled, corrosion-resistant condensers connected in series. As noted above, where superheated steam comprises the carrier gas, the steam condensed into water at this stage serves to dilute the condensed product to a degree which renders it suitable for further processing.

As products of the condensing stage there are obtained a gaseous product, i.e. "product gas," and a liquid product.

The product gas is obtained in a yield of 15–60% by weight, based on the dry starting material. It contains carbon dioxide, methane and other saturated hydrocarbons, and a small amount of ethylene and other unsaturated hydrocarbons. Its exact composition varies, depending primarily upon the temperature of the pyrolysis.

The product gas thus obtained may be used, after washing out its carbon dioxide content with lime, as a raw material for carbon monoxide syntheses. In the alternative, the product gas may be employed without fractionation or further treatment as the gaseous medium required for the presently described pyrolysis.

The liquid product as first obtained, is a brown fluid which separates upon standing into a non-aqueous organic phase and an aqueous or water-soluble-organic phase. The two phases may be separated by processing the total liquid product in a liquid product separator of suitable construction. This results in the separation of a non-aqueous phase fraction comprising about 20–60% by weight of the total liquid product and an aqueous phase fraction comprising from 40–80% of the total liquid product.

The non-aqueous organic phase consists primarily of tars and phenolic bodies such as guaiacol, the cresols, creosol, and the higher phenols. They are obtained in a yield of from 4–35% by weight, based on the dry weight of the starting material, and may be applied to the various industrial uses to which such materials are applicable either as a gross product or after fractionation.

The aqueous phase is made up of a solid component dissolved in an aqueous liquid. The aqueous liquid comprises principally water, but includes also appreciable quantities of formic acid, acetic acid, and soluble phenols.

The solid component of the aqueous phase, which represents from 14–38% by weight of the dry cellulosic material, consists of various carbohydrate fragments including levoglucosan and the carbohydrate-derived acids such as humic, saccharic and saccharinic acids, or other cleavage products of sugars. These products may be separated from the aqueous liquid in which they are dissolved, and used as a gross product. In the alternative, they may be separated from each other by suitable techniques such as selective solvent extraction and then applied to their various indicated uses.

Suitable apparatus for carrying out the foregoing sequence of operations is illustrated schematically in FIGURE 1.

As indicated in that figure, sawdust or other cellulosic particles are fed from a storage bin 10 through conduit 12 into a drier 14, where their moisture content is adjusted to a selected level of, for example, less than 5% by weight. The drier is heated by hot gas generated in gas heater 16 passing via conduit 18 into the drier from which it is exhausted through stack 20.

The dried particles leave the drier through conduit 22 and are valved by metering valve 24 into a conduit 26. Here they are mixed with the gaseous medium, for example, hot, recycled, product gas.

Next the predetermined mixture of particles and gas is passed in uniform, measured flow into a reactor indicated generally at 28. The reactor may assume various forms, illustrated in FIGURES 2–8 to be discussed hereinafter.

After a brief residence time in the reactor, the hot reaction mixture comprising char, condensable gases and non-condensable gases is passed into a solid-gas separator which, in the illustrated form of the invention, comprises a cyclone separator 30. Here the char is separated and gravitates into a receiver 32.

The hot gases exit from the cyclone via conduit 34 and next are passed through a condenser 36. This condenses the condensable gas component of the gaseous mixture.

The resultant two phases comprising the liquid phase including the condensed condensable gases and the gas phase comprising the non-condensable gases is passed into a liquid-gas separator 38.

The non-condensable gases including the carbon dioxide, hydrocarbon and other gases leave the seperator through conduit 40. Part of them are withdrawn through conduit 42 and are received in a gas holder 44. Another part passes through conduit 46 into gas compressor 48 which compresses them and passes them through conduit 50 and valve 52 into recycle gas heater 16.

Here, as explained above, the gases are heated to a temperature predetermined to raise the particles to the reaction temperature, and passed into conduit 26 where they are mixed with solid cellulosic particles and, together with them, recycled into reactor 28.

The liquid product emanating from gas separator 38 passes through a pipe 54 into a liquid product separator 56.

In this separator, the organic phase comprising phenolic bodies, tars and the like, is separated from an aqueous phase containing water-soluble organic components of the reaction.

The organic phase is withdrawn from the separator through line 58 which includes a pump 60. This transfers the organic phase to a receiver 62 where it is stored preliminary to its future disposal.

The aqueous phase, including the levoglucosan, carbohydrate-derived acids, and other desired pyrolytic degradation products is withdrawn from separator 56 via line 64 which includes a pump 66. It is stored in a tank 68 preliminary to its being conducted into a sequence of suitable apparatus and procedures designed to separate the organic constituents of the aqueous phase from each other. A particular desirable method of accomplishing the desired separation of the organic constituents comprises the subject matter of my co-pending application entitled "Separating Levoglucosan and Carbohydrate-Derived Acid From Aqueous Mixtures Containing The Same—By Solvent Extraction." In this manner levoglucosan may be separated from the carbohydrate-derived acids for application to their various uses.

As indicated above, pyrolytic reactor 28 may assume a diversity of forms and configurations depending upon such considerations as the identity of the starting material, the temperature and other reaction conditions and the identity of the pyrolytic product desired.

The reactor 28a illustrated in FIGURE 2 represents the simplest design. It comprises simply a substantially vertical tube having a substantial length, for example a length of as much as 120 feet. Its overall height may be reduced by including it, or by bending it slightly, thereby inducing a sweeping action of the carrier gas. Its length may be determined in part by the temperature employed and the reactor dwell time required. In other words, the length of the reactor may vary directly with the desired dwell time and inversely with the reaction temperature.

The reactor 28b illustrated in FIGURE 3 is of the updraft-downdraft type wherein updraft and downdraft zones are provided. Such an arrangement is possible because in prolysis by concurrent flow the carrier gas velocity is greater than the sedimentation velocity of the lignocellulose particles, so that they are swept rapidly through both the updraft and downdraft portions of the apparatus. This lends to the apparatus the advantages of accurate control of the brief pyrolysis interval. It also conserves space.

The downdraft-updraft reactor 28c of FIGURE 4 is the inverse of the reactor shown in FIGURE 3. In the first, or downdraft section, the carrier gas velocity can be reduced so that it is barely larger than the particle acceleration by gravity. In the terminal updraft section, the carrier gas velocity is sufficient to sweep the lighter char particles out of the reactor. In the intermediate or transitional section of the reactor, the larger particles which have not been decomposed by pyrolysis sufficiently to be swept out of the reactor in the updraft section are retained briefly until their pyrolysis is complete. This form of the apparatus thus affords exceptional control of the operating variables and also lends flexibility to it in that it enables accommodation of the apparatus to particles of varying size.

The spiral form of reactor 28d illustrated in FIGURE 5 may assume the shape of a coiled pipe, or of a cylindrical shell containing a spiral vane 102 in the manner illustrated. Such an apparatus reduces the overall height requirement while keeping unchanged the length of the reaction zone.

The reactor 28e of FIGURE 6 is designed to occupy minimum space while at the same time reducing the turbulence which might be present in a reactor of substantial diameter. It comprises a cylindrical shell divided into a multiplicity of vertical passageways by a network of interlaced partitions 104. In it, the carrier gas and particles to be pyrolyzed are swept rapidly upwardly through the passageways in updraft, concurrent flow, into the separator 30.

The reactor 28f of FIGURE 8 embodies a temporary particle suspension principle. The reactor comprises a cylindrical shell of substantial diameter and without partitions. The carrier gas velocity is maintained sufficiently high to keep the particles suspended in the lower part of the reactor. After part of the reaction time has elapsed, for example, a second or two, the pyrolyzed char particles have become light enough to be swept out by the carrier gas. There thus is a temporary interruption of the concurrent flow sufficient to effectuate the pyrolysis to the desired degree.

The apparatus of FIGURE 8 accordingly contains a built in retarding feature which retards the flow of the particles and gives superior control of the reaction. In addition, the reactor will accommodate particles of non-uniform size since the larger the particles, the longer they are retained until they are rendered light enough by pyrolysis to be swept out of the reactor. Still further, the height of the reactor may be maintained at a minimum.

The application of the invention to the manufacture of levoglucosan from wood is illustrated in the following examples:

EXAMPLE 1

Oven dry Douglas fir sawdust having a mesh size of —4, U.S. Sieve Series, was pyrolyzed in a pyrolytic reactor of the type illustrated in FIGURE 8, included in a system such as is illustrated in FIGURE 1. The reactor consisted of a vertical, hollow tube provided at its lower end with an inlet duct and at its upper end with an outlet duct communicating with a cyclone separator for separating the char from the gaseous product of the reaction.

The feed sawdust was mixed with heated product gas in the ratio of 7 pounds of gas per pound of sawdust. The sawdust in this mixture then was fed to the reactor at a flow rate of 12.5 pounds per hour.

The temperature within the reactor was 750° F. The pressure was maintained at atmospheric pressure. The velocity of the carrier gas was approximately 3000 ft./min. so as to maintain the particles in suspension in the chamber until their pyrolysis had been effected to the desired degree, whereupon the relatively light particles of char were conveyed out of the reactor into the cyclone separator. The average residence time of the gaseous components within the reactor was two seconds.

The product effluent from the reactor comprised 20% char, 64.8% condensed flow gases and 15.2% non-condensable gases, these representing quantities of 2.5, 8.1 and 1.9 pounds per hour respectively.

The gases leaving the cyclone next were passed through a condenser and thence into a liquid-gas separator, which separated the condensable gases from the non-condensable gases. The latter in part were vented and in part recycled. The former were passed to a liquid product separator which separated them into a non-aqueous phase, and an aqueous phase.

The non-aqueous organic phase represented 12.8% of the starting material or 1.6 pounds per hour. The aqueous phase represented 52% of the starting material or 6.5 pounds per hour. It contained 1.5 pounds per hour of levoglucosan representing 12.0% of the starting material. The water present represented 14% of the starting material, or 1.75 pounds per hour.

The aqueous phase was processed using the solvent extraction procedure of my co-pending application mentioned previously, resulting in a yield of 1.4 pounds per hour of levoglucosan representing 11.2% of the original starting material.

EXAMPLE 2

Shredded wastepaper (newsprint) was pyrolyzed in a pyrolytic reactor and system as described in Example 1 under similar conditions with the following exceptions: the feed wastepaper was mixed with heated product gas in the ratio of 7.2 pounds of gas per pound of wastepaper, the flow rate to the reactor was 8 pounds of wastepaper per hour and the temperature within the reactor was maintained at 1100° F.

The product effluent from the reactor comprised 31.7% char, 30.3% condensed flow gases and 38.0% non-condensable gases, these representing quantities of 2.54, 2.42, and 3.04 pounds per hour respectively.

The gases leaving the cyclone next were processed as described in Example 1. An aqueous phase was obtained representing 13.9% of the starting material or 1.11 pounds per hour. Upon processing using the solvent extraction system referred to in Example 1, a yield of 0.19 pound per hour of levoglucosan was obtained representing 2.4% of the original starting material.

EXAMPLE 3

Cotton linters were pyrolyzed in a pyrolytic reactor and system as described in Example 1 under similar conditions with the following exceptions: the feed cotton linters were mixed with the heated product gas in the ratio of 6.4 pounds of gas per pound of cotton linters and the flow rate to the reactor was 9 pounds of cotton linters per hour.

The velocity of the carrier gas was adjusted to approximately 4000 feet per minute resulting in an average residence time for the gaseous components within the reactor of 1.5 seconds.

The product effluent from the reactor comprised 16.6% char, 67% condensed flow gases and 15.5% non-condensable gases, these representing quantities of 1.5, 6.0, and 1.4 pounds per hour, respectively.

The gases leaving the cyclone next were processed as described in Example 1. An aqueous phase was obtained representing 56.6% of the starting material or 5.1 pounds per hour. Upon further processing using the solvent extraction system referred to in Example 1, a yield of 2.46 pounds per hour of levoglucosan was obtained representing 27.3% of the original starting material.

Having thus described the invention in preferred embodiments, what is claimed as new and desired to protect by Letters Patent is:

1. A process for the pyrolytic degradation of cellulosic material which comprises:
   (a) introducing small pieces of cellulosic material and a stream of heated gas substantially free of oxidizing effects into a reaction zone,
   (b) moving the pieces and the entraining hot gaseous medium in concurrent flow through the reaction zone,
   (c) maintaining the pieces in the reaction zone at a temperature of 600–1500° F. thereby forming a reaction product comprising char, condensable gases and non-condensable gases,
   (d) removing the reaction product from the reaction zone after a residence time not exceeding 30 seconds,
   (e) rapidly cooling the reaction product,
   (f) separating the resulting condensate of condensed gases and char from the non-condensable gases and
   (g) separating from the condensate the selected pyrolytic degradation products of the cellulosic material.

2. The process of claim 1 wherein the cellulosic pieces are maintained in the reaction zone at a temperature of 750° F. and the reaction product is removed after a residence time not exceeding 10 seconds.

3. The process of claim 1 wherein the cellulosic pieces and gaseous medium are moved through the reaction zone in substantially continuous, updraft concurrent flow.

4. The process of claim 1 wherein the cellulosic pieces and gaseous medium are moved through the first part of the reaction zone in updraft, concurrent flow and through the second part of the reaction zone in downdraft, concurrent flow.

5. The process of claim 1 wherein the reaction zone is provided in downdraft, updraft and intermediate transition zones and wherein the cellulosic pieces and gaseous medium are moved in concurrent flow at high velocity through the downdraft zone and at a lesser velocity through the updraft zone, the pieces being held in the transition zone for a time duration predetermined to reduce by pyrolysis their weight to a level at which they are moved by the gaseous medium through the updraft zone.

6. The process of claim 1 wherein the velocity of the gaseous medium relative to the cellulosic pieces is maintained at a level sufficient to suspend the pieces momentarily in the reaction zone, whereupon their weight is reduced by the pyrolytic operation occurring therein, the gaseous medium velocity thereupon being sufficient to sweep the particles from the reaction zone in concurrent updraft flow.

7. The process of claim 1 wherein the cellulosic pieces and gaseous medium are moved in spiralling concurrent flow through the reaction zone.

8. The process of claim 1 wherein the cellulosic material comprises lignocellulose.

9. The process of claim 1 including the step of separating the char from the reaction product prior to cooling the resulting gaseous reaction product.

References Cited by the Examiner

UNITED STATES PATENTS

| | | | |
|---|---|---|---|
| 1,941,809 | 1/1934 | McKee | 48—223 |
| 2,289,917 | 7/1942 | Lambiotte | 201—34 |
| 2,623,011 | 12/1952 | Wells | 201—31 |

MORRIS O. WOLK, *Primary Examiner.*

JAMES H. TAYMAN, JR., *Assistant Examiner.*